US010147105B1

(12) United States Patent
Iyer et al.

(10) Patent No.: US 10,147,105 B1
(45) Date of Patent: Dec. 4, 2018

(54) SYSTEM AND PROCESS FOR ANALYZING IMAGES AND PREDICTING PERSONALITY TO ENHANCE BUSINESS OUTCOMES

(71) Applicants: Ganesh Iyer, San Jose, CA (US); Roman Samarev, San Jose, CA (US); Sanjeev Ukhalkar, San Jose, CA (US)

(72) Inventors: Ganesh Iyer, San Jose, CA (US); Roman Samarev, San Jose, CA (US); Sanjeev Ukhalkar, San Jose, CA (US)

(73) Assignee: DOTIN LLC, San Jose, CA (US)

( * ) Notice: Subject to any disclaimer, the term of this patent is extended or adjusted under 35 U.S.C. 154(b) by 48 days.

(21) Appl. No.: 15/338,351

(22) Filed: Oct. 29, 2016

(51) Int. Cl.
*G06Q 30/02* (2012.01)
*G06K 9/62* (2006.01)
*G06T 1/00* (2006.01)
*G09B 5/00* (2006.01)

(52) U.S. Cl.
CPC ....... *G06Q 30/0202* (2013.01); *G06K 9/6212* (2013.01); *G06T 1/0007* (2013.01); *G09B 5/00* (2013.01)

(58) Field of Classification Search
CPC .................................................. G06K 9/6212
See application file for complete search history.

(56) References Cited

U.S. PATENT DOCUMENTS

| | | | |
|---|---|---|---|
| 8,644,596 B1 * | 2/2014 | Wu | G06K 9/00201 382/154 |
| 2007/0245379 A1 | 10/2007 | Agnihortri | |
| 2008/0260218 A1 * | 10/2008 | Smith | A61B 5/0077 382/128 |
| 2015/0310393 A1 | 10/2015 | Bhaskaran | |
| 2016/0019411 A1 | 1/2016 | Bart | |
| 2017/0193533 A1 * | 7/2017 | Lai | G06Q 30/0202 |

* cited by examiner

*Primary Examiner* — Qian Yang
(74) *Attorney, Agent, or Firm* — Plager Schack LLP; Mark H. Plager; Stephen Hallberg

(57) ABSTRACT

A system and a process are disclosed to analyze images and predict personality to enhance business outcomes by analyzing colors predominant in images selected, posted, or liked by a person, determining color values for the predominant colors in the images, weighting the color values, and, based on the weighted color values, deriving one or more personality attributes according to a particular psychological orientation.

7 Claims, 5 Drawing Sheets

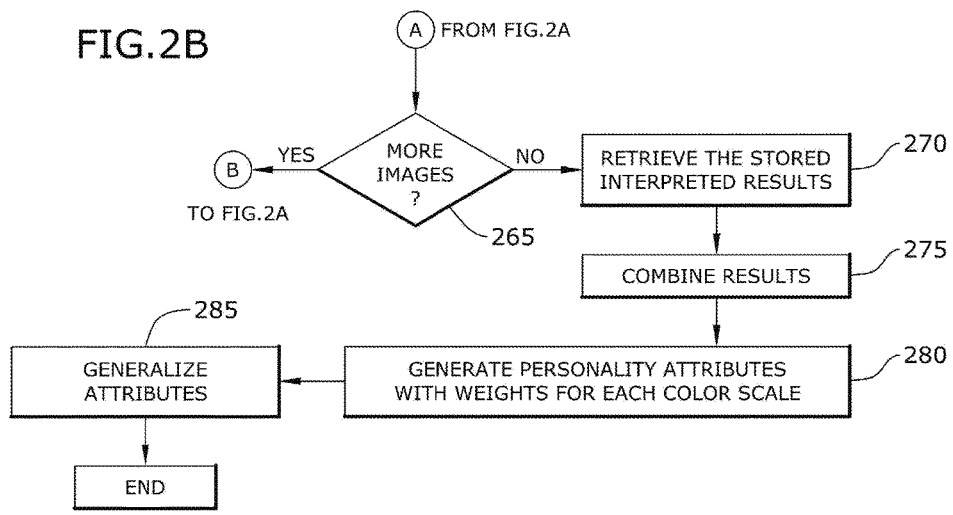
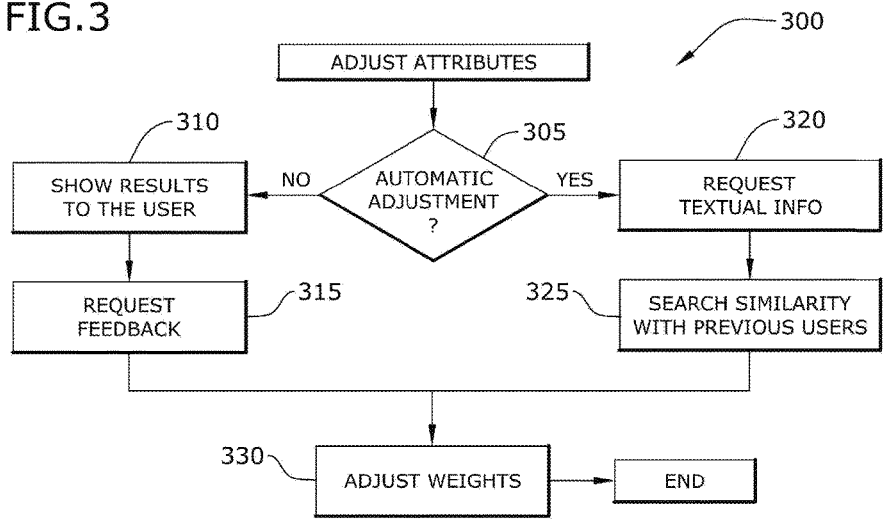

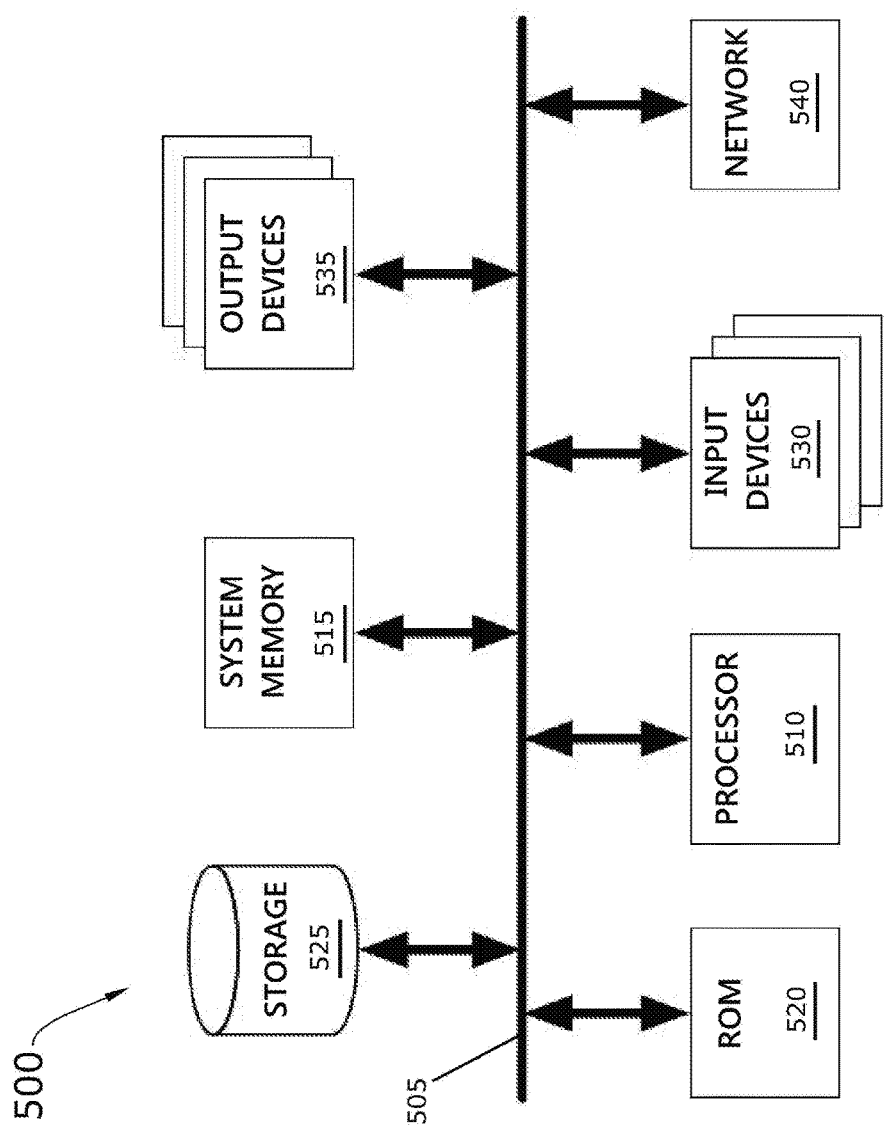

SYSTEM AND PROCESS FOR ANALYZING IMAGES AND PREDICTING PERSONALITY TO ENHANCE BUSINESS OUTCOMES

BACKGROUND

Embodiments of the invention described in this specification relate generally to business and marketing systems, and more particularly, to a system and a process for analyzing images and predicting personality to enhance business outcomes.

The world of marketing has problems with personalization of offers, knowing users' buying patterns, hiring people based on personality along with professional skills, team and organizational engagement and development, learning styles of users or employees, and finding warm sales leads. Unfortunately, while some existing business systems attempt to provide offer/engagement personalization, and try to understand their target or existing customers/people in ways that impact business outcomes, none of the existing systems have been able to understand and engage each person amongst a multitude of target or existing customers/people, who all have their own individual preferences, tendencies, buying habits, skills, working styles, etc., in ways that successfully enhance business outcomes.

Yet there are a number of networking resources, content platforms, and communicative channels that exist today and are built and/or deployed in ways that inherently provide untapped opportunities to understand a person and gain insights into the person's personality. For instance, many people regularly use social media platforms to post pictures, comment on pictures, or otherwise have an interest in pictures. To date, none of the existing networking resources, content platforms, or communicative channels have been leveraged in ways that would allow one to understand a person and the person's personality. Thus, the long-standing marketing world problems with personalization of offers, understanding/knowing buying patterns of people, hiring people with personalities, skills, cooperative/team-oriented working styles and learning styles, etc., that fit well for a particular marketing effort, and a host of other such people-oriented problems remain a plague on marketing efforts everywhere.

Therefore, what is needed is a way to improve or enhance business outcomes by predicting personality attributes of a person from images posted or liked by the person.

BRIEF DESCRIPTION

Some embodiments of the invention analyze images and predict personality to enhance business outcomes by analyzing colors predominant in images selected, posted, or liked by a person (hereinafter "user"), determining color values for the predominant colors in the images, weighting the color values, and, based on the weighted color values, deriving one or more personality attributes according to a particular psychological orientation. Some of the embodiments include a novel process for predicting personality to enhance business outcomes. Some of the embodiments include a novel system that predicts personality to enhance business outcomes.

In some embodiments, the process for predicting personality to enhance business outcomes is based on analysis of colors in one or more images associated with a user, thereby allowing an image value to be determined according to the color analysis, and for one or more personality attributes to be derived from the image value according to a particular psychological orientation.

In some embodiments, the process for predicting personality to enhance business outcomes includes retrieving an image to analyze, extracting attributes from the image, adjusting the attributes, and predicting personality based on the attributes.

In some embodiments, the process for predicting personality to enhance business outcomes includes identifying a plurality of images to analyze, and for each image in the plurality of images to analyze, retrieving the image to analyze, extracting attributes from the image, adjusting the extracted attributes, and predicting personality based on the attributes.

In some embodiments, the system that predicts personality to enhance business outcomes includes a data analyzer which processes images to generate personality attributes used to predict personality and enhance business outcomes. The data analyzer of some embodiments includes an image collector, a color extractor, and an attributes interpreter. In some embodiments, the system further includes an images uploader, an optional textual information add-on module, and a user feedback module.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 2B conceptually illustrates a continuation of the process for extracting attributes of an image stored for analysis to predict personality and enhance business outcomes.

FIG. 3 conceptually illustrates a process for adjusting attributes extracted from an image stored for analysis to predict personality and enhance business outcomes in some embodiments.

FIG. 5 conceptually illustrates an electronic system with which some embodiments of the invention are implemented.

DETAILED DESCRIPTION

Figure 1:
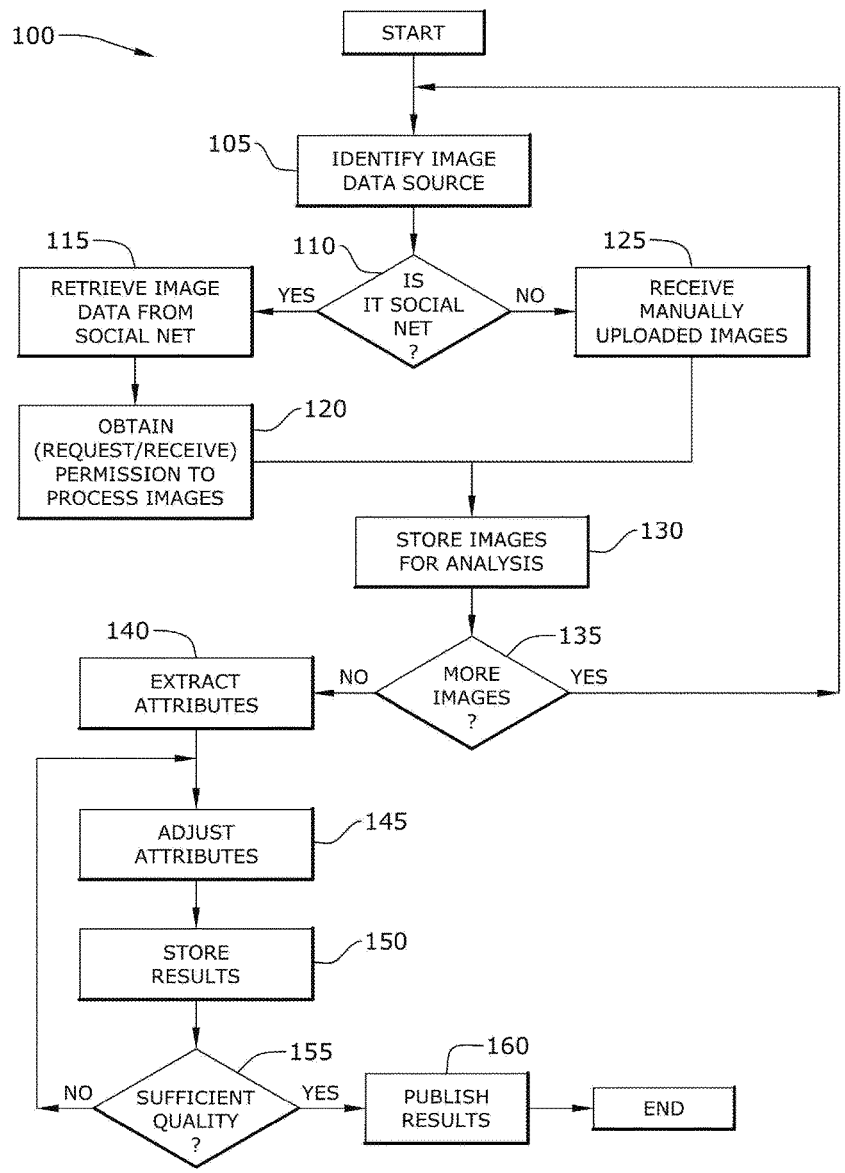
FIG. 1 conceptually illustrates a process for predicting personality to enhance business outcomes in some embodiments.

In the following detailed description of the invention, numerous details, examples, and embodiments of a novel process for predicting personality to enhance business outcomes and a system to predict personality and enhance business outcomes are described. In this description certain trademarks, word marks, and/or copyrights are referenced, including FACEBOOK®, which is a registered trademark of Facebook, Inc., and INSTAGRAM®, which is a registered trademark of Instagram, LLC. However, it will be clear and apparent to one skilled in the art that the process for predicting personality to enhance business outcomes is not limited to the embodiments set forth and that the process for predicting personality to enhance business outcomes can be adapted for any of several applications.

Some embodiments of the invention predict personality to enhance business outcomes by analyzing colors predominant in images selected, posted, or liked by a person, determining color values for the predominant colors in the images, weighting the color values, and, based on the weighted color values, deriving one or more personality attributes according to a particular psychological orientation. Some of the embodiments include a novel process for predicting personality to enhance business outcomes. Some of the embodiments include a novel system that predicts personality to enhance business outcomes.

In some embodiments, the process for predicting personality to enhance business outcomes is based on analysis of colors in one or more images associated with a user, thereby allowing an image value to be determined according to the color analysis, and for one or more personality attributes to be derived from the image value according to a particular psychological orientation.

In some embodiments, the process for predicting personality to enhance business outcomes includes retrieving an image to analyze, extracting attributes from the image, adjusting the attributes, and predicting personality based on the attributes.

In this specification, there are descriptions of processes or methods that are performed by software running on a computing device (e.g., a desktop computer, a server, a laptop, a tablet computing device, a smartphone, etc.) in order for images to be received, retrieved, or otherwise accessed for analysis to begin in relation to predicting personality of a person associated with the images. In some cases, multiple software modules are deployed on multiple computing devices, thereby allowing a user-driven action to start an analysis and/or provide or select images to use in the analysis. For example, the user may employ a computing device to connect to and interact with a cloud service for predicting personality to enhance business outcomes, which may be hosted on a cloud-network server. A variety of network and standalone configurations are described in greater detail below. However, it should be noted that for the purposes of the embodiments described in this specification, the word "method" is used interchangeably with the word "process". Methods are described, therefore, by reference to example processes that conceptually illustrate process steps for predicting personality to enhance business outcomes.

In some embodiments of the process for predicting personality to enhance business outcomes, determining personality involves an analysis that is constrained to an examination of images selected by a user. In other words, other personality indicators are not considered by the process for predicting personality to enhance business outcomes disclosed in this specification. Also, images selected by the user may include selection in a broad sense of the term. Thus, in some embodiments, the user selected images comprise a set of images selected from a list of images. In some embodiments, the user selected images comprise a set of images retrieved from an image repository. In some embodiments, the user selected images comprise a set of images retrieved from one or more social media platforms. In some embodiments, the user selected images comprise a set of images received from a computing device that transferred the images upon a user choosing to upload the set of images.

In some embodiments, still other constraints or restrictions are applied to one or more steps of the processes or methods described in this disclosure. Specifically, in some embodiments, the process for predicting personality to enhance business outcomes restricts a number of images to analyze. In some embodiments, the process for predicting personality to enhance business outcomes restricts analysis to a particular psychological orientation. In some embodiments, the process for predicting personality to enhance business outcomes restricts user feedback intended to adjust a value of extracted attributes.

Several more detailed embodiments are described below. Section I generally describes analyzing images to predict personality and enhance business outcomes. Section II describes a process for predicting personality to enhance business outcomes and some associated processes. Section III describes an architecture of an exemplary system that predicts personality to enhance business outcomes. Lastly, Section IV describes an electronic system that implements some embodiments of the invention.

I. Analyzing Images to Predict Personality and Enhance Business Outcomes

As stated above, the world of marketing has problems with personalization of offers, knowing users' buying patterns (traditional buyer, budget-minded buyer, impulsive buyer, etc.), hiring people based on personality along with professional skills, team and organizational engagement and development (knowing their learning styles), learning styles of users or employees, and finding warm sales leads. Unfortunately, while some existing business systems attempt to provide offer/engagement personalization, and try to understand their target or existing customers/people in ways that impact business outcomes, none of the existing systems have been able to understand and engage each person amongst a multitude of target or existing customers/people, who all have their own individual preferences, tendencies, buying habits, skills, working styles, etc., in ways that successfully enhance business outcomes.

However, there are a number of networking resources, content platforms, and communicative channels that exist today and are built and/or deployed in ways that inherently provide untapped opportunities to understand a person and gain insights into the person's personality. For instance, many people regularly use social media platforms to post pictures, comment on pictures, or otherwise have an interest in pictures. To date, none of the existing networking resources, content platforms, or communicative channels have been leveraged in ways that would allow one to understand a person and the person's personality. Thus, the long-standing marketing world problems with personalization of offers, understanding/knowing buying patterns of people, hiring people with personalities, skills, cooperative/team-oriented working styles and learning styles, etc., that fit well for a particular marketing effort, and a host of other such people-oriented problems remain a plague on marketing efforts of industries everywhere.

Embodiments of the process for predicting personality to enhance business outcomes described in this specification solve such problems by extracting hidden personality attributes from a user's liked or posted images. The images may be provided by a user or selected by the user from a list of predefined (or previously posted) images. For instance, the user may like images from or post images to social networking sites (e.g., FACEBOOK®, INSTAGRAM®, etc.). Personality attributes extraction is based on preferred colors extraction from liked images and psychological interpreting of these colors including probabilistic prediction of most valuable positive and negative personality attributes, top colors affinity, most appropriate and non-appropriate employment, groups of products that a user may buy, groups of products that a user may not buy, user learning habits and kind of buying pattern that can be detected (e.g., impulsive buyer, traditional buyer, buyer on budget, etc.).

Embodiments of the process for predicting personality to enhance business outcomes described in this specification differ from and improve upon currently existing options. In particular, some embodiments of the process for predicting personality to enhance business outcomes differ by an objects agnostic approach that combines image analysis with a psychology oriented approach to extracting personality attributes in order to predict a digital personality of a user. The process for predicting personality to enhance business outcomes uses an ensemble of images prepared or selected by a user (hereinafter "comprehended images"), thereby allowing a psychological analysis of the comprehended images in order to derive a digital personality signature associated with the user. Furthermore, the process for predicting personality to enhance business outcomes combines the power of extracting information from one or more social networks to enhance the digital personality signature of the user.

In addition, the process for predicting personality to enhance business outcomes improve upon the currently existing options because other existing systems are not oriented to personality extraction and do not consider feedback of a user in any significant analysis. In contrast, the process for predicting personality to enhance business outcomes described in this specification is based on analysis of personality attributes that are identified based on a constrained set of inputs, namely, the comprehended images selected by, posted by, or liked by the person or user.

II. Process for Predicting Personality to Enhance Business Outcomes and Associated Processes In some embodiments, the process for predicting personality to enhance business outcomes includes identifying a plurality of images to analyze, and for each image in the plurality of images to analyze, retrieving the image to analyze, extracting attributes from the image, adjusting the extracted attributes, and predicting personality based on the attributes.

In some embodiments, the process for predicting personality to enhance business outcomes restricts the number of images that can be used in an analysis. In some embodiments, the process for predicting personality to enhance business outcomes restricts a psychological orientation of the image analysis. In some embodiments, the process for predicting personality to enhance business outcomes restricts the use of feedback from a user in adjusting the value of extracted attributes. In some embodiments, the preciseness or quality of the prediction is improved by restricting one or more of the quantity or the number of images to use during the image analysis, the psychological orientation or approach for the image analysis, and the use of feedback from the user in adjusting a value of extracted attributes.

By way of example, FIG. 1 conceptually illustrates a process for predicting personality to enhance business outcomes 100. The process for predicting personality to enhance business outcomes 100 shown in this figure may be implemented as a software application that runs on a computing device. The software application may be deployed as a standalone system that retrieves images to analyze from a local resource. Alternatively, the software application may be deployed in a cloud network system in which a web application service provides ability to a user to connect and interact with the service.

In some embodiments, the process for predicting personality to enhance business outcomes 100 starts prior to having images to analyze. Thus, the process for predicting personality to enhance business outcomes 100 identifies (at 105) an image data source. The image data source may be a single image database (e.g., a cloud-based database, an attached database, etc.) or several image databases that are physically or logically disparate and which may be located in different physical locations that are accessible via different network addresses (e.g., URLs, URIs, etc.). Whether the image data source is one image database or multiple image databases, for simplicity (but not for limitation) reference to the image data source will be made in the singular for this example (even if the data source spans multiple databases).

After the image data source is identified, the process 100 determines (at 110) whether the image data source is an online social networking or social media platform or site. For example, when a user posts images on INSTAGRAM®, the images can be identified as coming from a particular image data source associated with INSTAGRAM®. In some embodiments, the image data source is accessible by one or more application programming interfaces (APIs) that are made public by an originating source.

In some embodiments, when the image data source is determined (at 110) to be an online social networking site, the process for predicting personality to enhance business outcomes 100 retrieves (at 115) image data from the online social networking site. In some embodiments, the process for predicting personality to enhance business outcomes 100 obtains (at 120) permission to process the images. In some embodiments, the process 100 obtains permission by requesting and receiving permission before processing the images.

On the other hand, when the image data source is not determined (at 110) to be an online social networking site, the process for predicting personality to enhance business outcomes 100 does not retrieve (at 115) image data from the online social networking site and does not obtain (at 120) permission to process the images. Instead, when the image data source is not determined (at 110) to be an online social networking site, the process for predicting personality to enhance business outcomes 100 receives (at 125) manually uploaded images from the user. For example, the user may select a set of images to upload from a computing device that the user is working with to interact with the software service. The images manually uploaded from the user may be stored in a local data storage device (e.g., on disk, in an external connectable hard driver, on a thumb drive, on an image capture device, etc.) or may be stored in a cloud storage database and transferred via the user interacting with the cloud storage database to upload images from the cloud.

Regardless of the originating location of the images, the process for predicting personality to enhance business outcomes 100 stores (at 130) the images for analysis. For example, if the software application that implements this process is a cloud-network web service, the user may select an option to save the images to a cloud database. Next, the process for predicting personality to enhance business outcomes 100 determines (at 135) whether there are more images for the user to provide. For example, the user may provide more images from a local resource or there may be another social networking site from which to retrieve more images to be analyzed. When there are more images, the process 100 transitions back to the start to identify (at 105) the image data source, which is described in greater detail above.

On the other hand, when there are no more images, the process for predicting personality to enhance business outcomes 100 extracts (at 140) attributes from the images. Attributes are extracted by re-sampling an image, converting image colors to a particular scale, and then processing the colors according to the scale. Particular details of extracting attributes are described in greater detail by reference to FIG. 2 below.

In some embodiments, the process for predicting personality to enhance business outcomes 100 adjusts (at 145) the attributes. Adjusting attributes can be done automatically or based on user interaction. In some embodiments, adjusting attributes involves applying one or more weights to attribute values. Further details of adjusting attributes are described by reference to FIG. 3 below.

After extracting and adjusting the attributes, the process for predicting personality to enhance business outcomes 100 of some embodiments stores the results (at 150). Next, the process for predicting personality to enhance business outcomes 100 determines (at 155) whether the results of the attribute adjustment are of sufficient quality. In some embodiments, extracted attributes are presented as a mathematical multidimensional vector. Quality is determined by calculating the relative proximity of a first vector from a first attribute adjustment iteration to a second vector from a second (subsequent) attribute adjustment iteration, or the similarity of orientation of the two vectors. Thus, quality is a measure of the proximity of vectors between two iterations. Proximity or similarity of two vectors is measured by calculating Euclidean or Cosine distance between the two vectors. In some embodiments, the quality is sufficient when a distance between the two vectors is less than a threshold distance. In some embodiments, the threshold distance is a configurable parameter that allows for varying measurements of proximity or similarity for different images or for different functions in predicting personality.

Accordingly, when the results are less than sufficient in quality, the process 100 transitions back to adjusting (at 145) the attributes. In this case, the attributes are adjusted according to the already adjusted attributes. In other words, prior adjustments are not removed.

On the other hand, when the results of the attribute adjustments are sufficient in quality, the process for predicting personality to enhance business outcomes 100 publishes (at 160) the results. For example, the results may include a personality attribute profile of the user and include recommendations that allow a marketing executive to tailor communications and/or marketing to the user, person, group of people, etc. The publication of the results may include printouts, visual display output, etc. After publishing the results, the process for predicting personality to enhance business outcomes 100 ends.

Figure 2A:
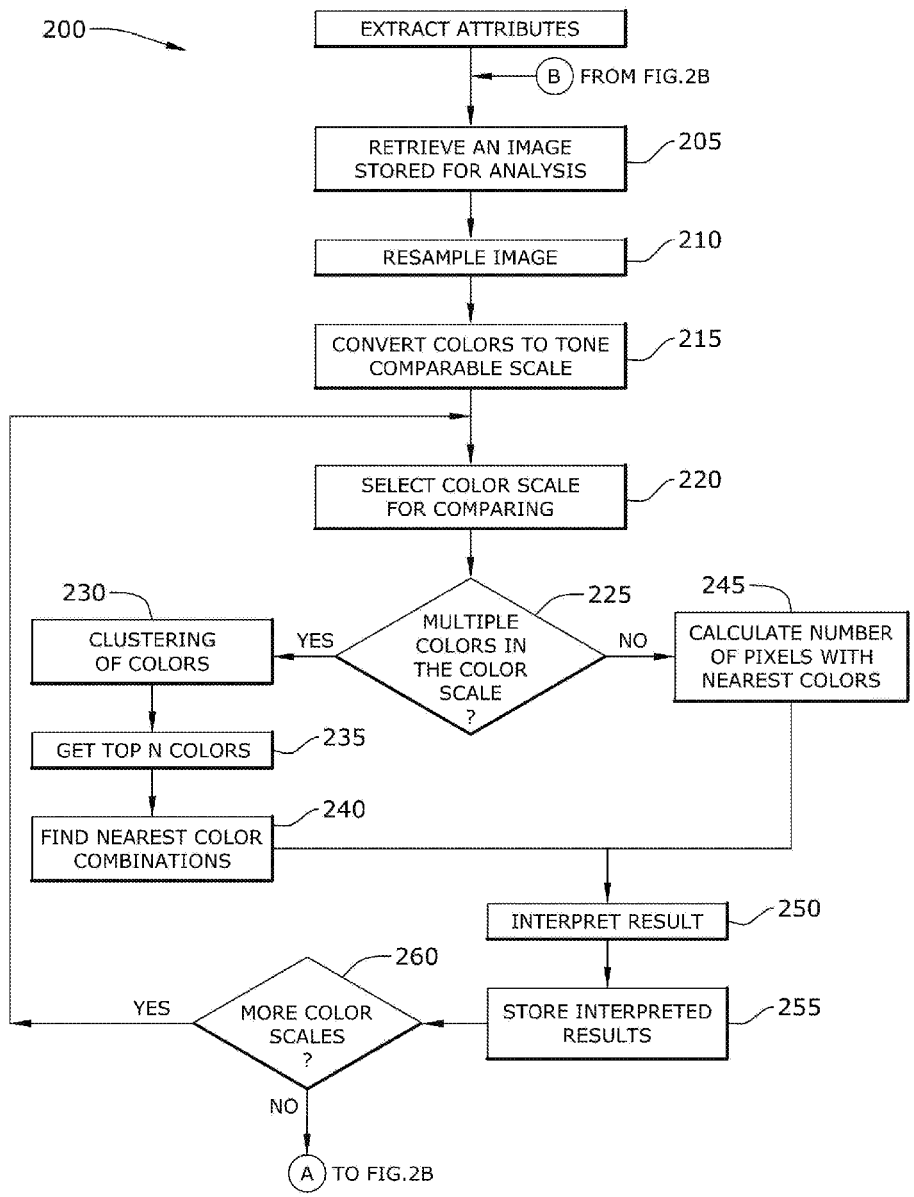
FIG. 2A conceptually illustrates a process for extracting attributes of an image stored for analysis to predict personality and enhance business outcomes in some embodiments.

Turning to another example, FIGS. 2A and 2B conceptually illustrate a process for extracting attributes 200 of one or more images stored for analysis to predict personality and enhance business outcomes. While the description of FIG. 1 included a brief explanation of how the process for predicting personality to enhance business outcomes 100 extracts attributes (at 140 of FIG. 1) from the images, the process for extracting attributes 200 described in this section provides a more detailed description of a method which the process for predicting personality to enhance business outcomes 100 may use to extract attributes from the images.

In reference to FIG. 2A, the process for extracting attributes 200 starts when the images are selected and ready for analysis. In some embodiments, the process for extracting attributes 200 retrieves (at 205) an image stored for analysis. As noted above, in relation to FIG. 1, the images stored for analysis are those which have been received, retrieved, or otherwise obtained. Thus, the process for extracting attributes 200 works with these images, which may include one image or multiple images. When there are multiple images, the process for extracting attributes 200 processes each image individually. Thus, the retrieved image is a first image from a set of one or more images.

In some embodiments, the process for extracting attributes 200 re-samples (at 210) the retrieved image. The re-sampling of the image is for working with the colors present in the image. For any image, there is typically a color space that defines a range of colors for the image. Different color spaces use different scales to represent the various gradations of each color. Thus, after the image is re-sampled, the process for extracting attributes 200 converts (at 215) the colors to a tone comparable scale. In effect, the differences between color scales in different images is normalized to a particular color scale. After the colors of the image are converted to the tone comparable scale, the process for extracting attributes 200 selects (at 220) the color scale for comparing colors in the image.

In some embodiments, the process for extracting attributes 200 determines (at 225) whether there are multiple colors in the color scale. When there are multiple colors in the color scale, the process for extracting attributes 200 handles the multiple colors (at 230-240, which is described in greater detail below). On the other hand, when there are not multiple colors in the color scale, the process for extracting attributes 200 calculates (at 245) a number of pixels with nearest color. Then the process for extracting attributes 200 interprets the results (at 250, which is described in greater detail below). Turning back to the case when there are multiple colors in the color scale, the process for extracting attributes 200 handles this by clustering the colors (at 230), retrieving (at 235) a number of colors that represent the top colors, and finding (at 240) the nearest color combinations.

In some embodiments, the process for extracting attributes 200 interprets (at 250) the results of the nearest colors. This interpretation will depend on the number of colors being evaluated. For instance, the interpretation may take only the top color in an image and base the entire personality prediction on this single top color. In other examples, the interpretation may take the top two colors in the image, or the top three colors, and base the personality prediction for this image on those top two or three colors. In some other embodiments, the interpretation is based on only the top colors that satisfy some threshold percentage of color for the image. For example, the interpretation may only consider colors with a saturation of 25% or more of the pixels in the image. In this example, one can imagine a picture of a snow-covered landscape on a bright day to have two predominant colors—blue and white, which would presumably exceed the threshold percentage for the image. On the other hand, an image of a diverse action scene, say of a parade, may have no single color that meets the threshold. In such cases, the interpretation can use fall back criteria (e.g., going with the top single color in the image) or simply skip the image (e.g., as indeterminate). While the examples above provide an understanding of what the interpretation would be based on, a person skilled in the art would appreciate that there are many other manners of determining top colors of an image, and that these examples are not intended as limiting. No matter how the results are derived, after the interpretation is complete the process for extracting attributes 200 stores (at 255) the interpreted results for adjustments (if any).

While the process for extracting attributes 200 is able to process for multiple colors in a color scale (as described above at 230-240), it can also process for multiple color scales. Thus, the process for extracting attributes 200 determines (at 260) whether there are more color scales to process for the present image. Where there are more color scales, the process for extracting attributes 200 transitions back to the step for selecting the color scale for comparing (at 220). For example, there might be three color scales, so the process for extracting attributes 200 would transition back to 220 for each color scale in order. On the other hand, when there are no more color scales, the process for extracting attributes 200 then transitions to the next step, which is described next, by reference to FIG. 2B.

As shown in FIG. 2B, the process for extracting attributes 200 continues to the next step of determining (at 265) whether there are more images to consider. When there are more images to consider, the process for extracting attributes 200 transitions back to the start to retrieve (at 205 in FIG. 2A) the (next) image stored for analysis. Otherwise, when there are no more images, the process for extracting attributes 200 then retrieves (at 270) the stored interpreted results. These results are the interpreted results stored at step 255, as shown in FIG. 2A. The interpreted results may be retrieved from any location, including a memory module of a computing device on which the software is running, a persistent storage device of the computing device, an external persistent storage device, a cloud storage, or any other data storage resource.

After retrieving the stored interpreted results, the process for extracting attributes 200 then combines (at 275) the results. Next, the process for extracting attributes 200 generates (at 280) personality attributes with weights for each color scale. For example, a top color may have a weight of one and a second color may have a weight of 0.5, which would then result in a heavier valuation on the top color, thereby allowing a personality attribute to be determined according to the relative saturation of the top colors. This is important especially when multiple colors are considered in predicting personality because two images that both have two top colors red and blue may not have the same personality attributes—one image may have more red pixels than blue pixels, while the other image may have more blue pixels than red pixels. To accurately predict personality, the relative color saturation or percentages are therefore accounted for when predicting personality. In some embodiments, the process for extracting attributes 200 then generalizes (at 285) the personality attributes. Then the process for extracting attributes 200 ends.

While the example above provides a more detailed description of the steps for extracting attributes, other steps of the process for predicting personality to enhance business outcomes 100 warrant further description.

One such step is described by reference to FIG. 3, which conceptually illustrates a process for adjusting attributes 300 extracted from one or more images stored for analysis to predict personality and enhance business outcomes. The process for adjusting attributes 300 provides a detailed example of how the process for predicting personality to enhance business outcomes 100 adjusts (at 145 of FIG. 1) the attributes.

In some embodiments, the process for adjusting attributes 300 starts by determining (at 305) whether to automatically adjust the attributes. When automatic adjustment is not called for, the process for adjusting attributes 300 shows the results (at 310) to the user and then requests feedback (at 315) from the user. On the other hand, when automatic adjustment is needed, the process for adjusting attributes 300 first requests (at 320) textual information about the intended adjustment, and then searches (at 325) for similarity with previous users.

In some embodiments, the process for adjusting attributes 300 then adjusts (at 330) the weights to apply to the results. For example, instead of having weights of 1.0 for the top color and 0.5 for the second color, the adjustment may reel these two weights closer to each other, which the top color having a weighted value of 0.8 and the second color having a weight value of 0.7. In this way, the results can be effectively adjusted. Then the process for adjusting attributes 300 ends.

In addition to the processes described in this section, other steps and sub-processes can be used in relation to predicting personality to enhance business outcomes. For instance, in some embodiments, the process for predicting personality to enhance business outcomes highlights valuable positive and negative personality attributes of a user.

In some embodiments, the process for predicting personality to enhance business outcomes predicts a most appropriate employment and a most inappropriate employment.

In some embodiments, the process for predicting personality to enhance business outcomes predicts products or groups of products that a user is likely to buy. In some embodiments, the process for predicting personality to enhance business outcomes predicts products or groups of products that a user is not likely to buy.

In some embodiments, the process for predicting personality to enhance business outcomes identifies learning habits of a user and predicts a buying pattern of the user. In some embodiments, the buying pattern is one of an impulsive buyer, a traditional buyer, and a budget buyer.

In some embodiments, the process for predicting personality to enhance business outcomes predicts a learning pattern of a user.

In some embodiments, the process for predicting personality to enhance business outcomes predicts a set of top colors that a user is inclined to like.

In some embodiments, the process for predicting personality to enhance business outcomes matches a user with other users predicted to be like-minded users.

III. System that Predicts Personality to Enhance Business Outcomes

A system that predicts personality to enhance business outcomes of the present disclosure may be comprised of the following elements. This list of possible constituent elements is intended to be exemplary only and it is not intended that this list be used to limit the system that predicts personality to enhance business outcomes of the present application to just these elements. Persons having ordinary skill in the art relevant to the present disclosure may understand there to be equivalent elements that may be substituted within the present disclosure without changing the essential function or operation of the system that predicts personality to enhance business outcomes.

1. Software (or software application, software module, software program, etc.) that implements the process for predicting personality to enhance business outcomes; the software may include an HTTP-based application programming interface ("API").

2. Files in image formats (any of several image formats including, without limitation, JPEG or JPG, PNG, IMG, RAW, BMP, etc.).

3. Image locations (e.g., URI or URL network address to image resources).

4. Data gathering module(s) of the software, including an image uploading module, a user feedback module, a text information module, and an image collection module.

5. Data analysis module(s) of the software.

6. Personality attributes (derived from data analysis in light of a psychological orientation).

7. Business Outcomes (e.g., a defined set of potential business outcomes).

8. Continuous refinement in recursive or looped software function repeating (for example, repeated adjustment of extracted image results based on a user's feedback).

The system that predicts personality to enhance business outcomes of the present disclosure generally works by software that implements one or more of the processes described above and detects the most valuable colors and color combinations from images which are provided by users. Each image is processed individually and interpreted by a set of color scales prepared by psychologists which produces an ensemble of different aspects. Then, by gathering together results of analysis of individual images, the software extracts integrated user's personality attributes and sends to the user. The user is able to correct a weight of the value of extracted attributes which enables feedback to the module.

To make the system that predicts personality to enhance business outcomes of the present disclosure, one may develop the software and deploy on computing devices that communicate over a network (such as the Internet or a local area network or wide area network) or that operate in standalone mode. The system that predicts personality to enhance business outcomes may include modules that have results of psychological research that links personality attributes and perception of colors and color combinations by a human and which allows for detection of valuable colors and extraction of personality attributes. The software and/or modules which implement the processes for predicting personality to enhance business outcomes may optionally allow for user uploading of images or for the user to provide a URL to external image resources, and may optionally allow for users to provide feedback to in relation to adjusting the value of the extracted personality attributes.

Figure 4:
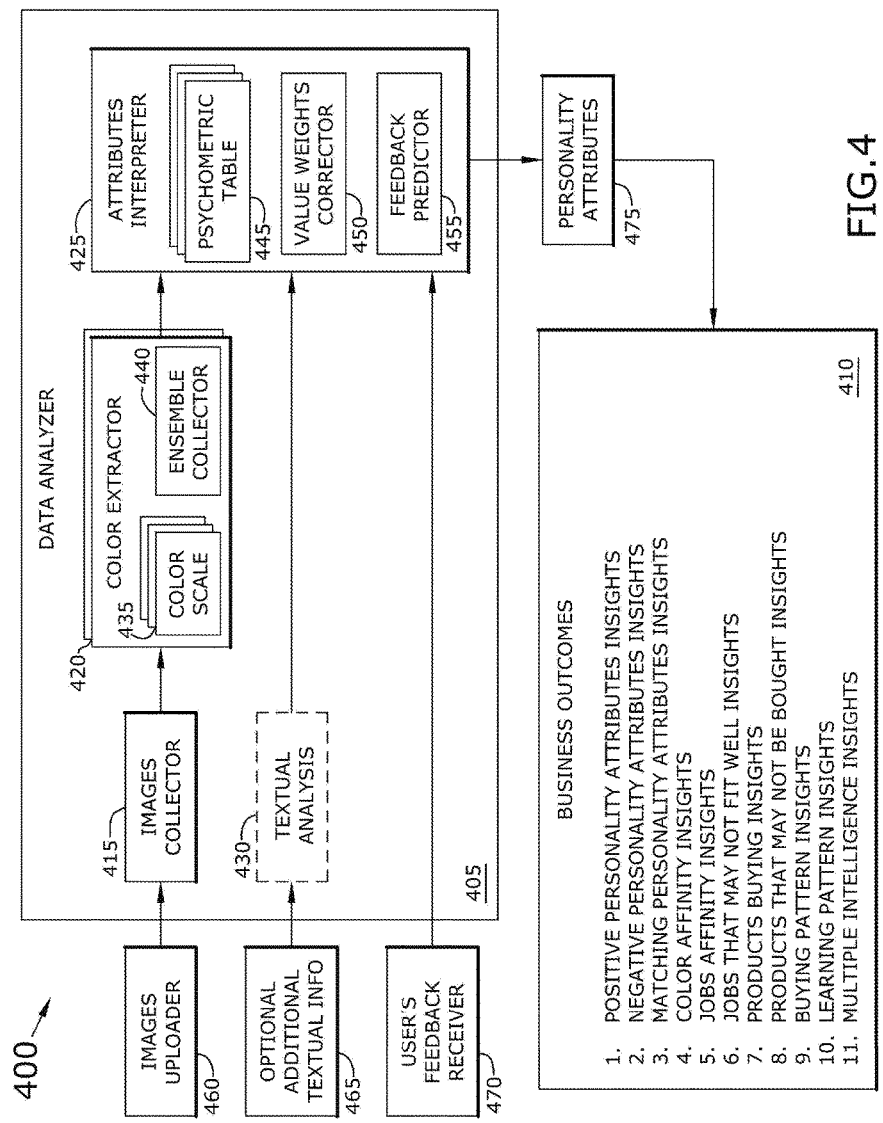
FIG. 4 conceptually illustrates a block diagram of a system that predicts personality to enhance business outcomes in some embodiments.

An example of a system that predicts personality to enhance business outcomes 400 is described next by reference to FIG. 4. As shown in this figure, the system that predicts personality to enhance business outcomes 400 includes a data analyzer computing system 405 which processes images to generate personality attributes 475 which are used to predict personality and enhance business outcomes, as shown in business outcomes block 410. The business outcomes block 410 conceptually represents one or more deployment modules, computing services, and/or devices for carrying out customer personalization interactions based on the resulting personality attributes 475. The data analyzer computing system 405 includes an image collector module 415, a color extractor module 420, and an attributes interpreter module 425. The data analyzer computing system 405 may optionally include a textual analysis module 430. The color extractor module 420 includes a color scale manager 435 module that manages several color scales. The color extractor module 420 also includes an ensemble collector 440 module. The attributes interpreter module 425 includes a psychometric management module 445 that manages several psychometric tables. The attributes interpreter module 425 also includes a value weights correction module 450 and a feedback predictor module 455.

A number of additional modules, computing devices, and/or sub-systems feed data and image content to the data analyzer computing system 405. Specifically, the system that predicts personality to enhance business outcomes 400 as shown in this figure includes an images uploader module 460, an optional textual information add-on module 465, and a user feedback module 470 that receives user feedback from a computing device of the user or which itself is the computing device of the user who is providing the feedback.

The data analyzer computing system 405 may be a single computing device in standalone mode or may be a cloud server that hosts a personality prediction and business outcome enhancement service that is accessible to computing devices over the Internet. In some embodiments, the data analyzer computing system 405 includes a plurality of computing devices that interact in direct relation to each other to predict personality and enhance business outcomes. Therefore, to use the system that predicts personality to enhance business outcomes 400, one may use a computing device with software that connects over the Internet to a web service (e.g., a web application, cloud application, or cloud service), or may use software that is integrated into existing selling software system(s) and connect to the web service or may be used as a standalone service. The system that predicts personality to enhance business outcomes may be used by persons as a type of psychological examination to understand his or her most or least valuable personality attributes. Furthermore, the system that predicts personality to enhance business outcomes may be used to enhance quality of recommendation systems by using hidden personality information.

IV. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 5 conceptually illustrates an electronic system 500 with which some embodiments of the invention are implemented. The electronic system 500 may be a computer, phone (cell phone, mobile phone, smartphone, etc.), PDA (iPod, other handheld computing device, etc.), or any other sort of electronic device or computing device. Such an electronic system includes various types of computer readable media and interfaces for various other types of computer readable media. Electronic system 500 includes a bus 505, processing unit(s) 510, a system memory 515, a read-only 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only 520, the system memory 515, and the permanent storage device 525.

From these various memory units, the processing unit(s) 510 retrieves instructions to execute and data to process in order to execute the processes of the invention. The processing unit(s) may be a single processor or a multi-core processor in different embodiments.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as an external hard drive or a flash drive) as the permanent storage device 525. Like the permanent storage device 525, the system memory 515 is a read-and-write memory device. However, unlike storage device 525, the system memory 515 is a volatile read-and-write memory, such as a random access memory. The system memory 515 stores some of the instructions and data that the processor needs at runtime. In some embodiments, the invention's processes are stored in the system memory 515, the permanent storage device 525, and/or the read-only 520. For example, the various memory units include instructions for processing appearance alterations of displayable characters in accordance with some embodiments. From these various memory units, the processing unit(s) 510 retrieves instructions to execute and data to process in order to execute the processes of some embodiments.

The bus 505 also connects to the input and output devices 530 and 535. The input devices enable the user to communicate information and select commands to the electronic system. The input devices 530 include alphanumeric keyboards and pointing devices (also called "cursor control devices"). The output devices 535 display images generated by the electronic system 500. The output devices 535 include printers and display devices, such as cathode ray tubes (CRT) or liquid crystal displays (LCD). Some embodiments include devices such as a touchscreen or touch-sensitive screen that functions as both input and output devices.

Finally, as shown in FIG. 5, bus 505 also couples electronic system 500 to a network 540 through a network adapter (not shown). In this manner, the computer can be a part of a network of computers (such as a local area network ("LAN"), a wide area network ("WAN"), or an intranet), or a network of networks (such as the Internet). Any or all components of electronic system 500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable BLU-RAY® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1-3 conceptually illustrate processes in which the specific operations of these processes may not be performed in the exact order shown and described. Specific operations may not be performed in one continuous series of operations, and different specific operations may be performed in different embodiments. Furthermore, the processes could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory computer readable medium storing a program which when executed by at least one processing unit of a computing device with a random access memory (RAM), analyzes images and predicts personality to enhance business outcomes, said program comprising sets of instructions for:

obtaining a plurality of color images associated with a user, wherein a first color image of the plurality of color images has a color space with a first range of colors in a first color scale and a second color image of the plurality of color images has the same color space with a second range of colors in a second color scale;

resampling, and storing in the RAM of the computing device, each color image in the plurality of color images associated with the user to reduce a number of pixels to analyze in the color image, wherein each resampled color image in the plurality of resampled color images is analyzed to identify colors of pixels in the resampled color image;

converting colors of pixels of each resampled color image in the plurality of resampled color images to pixels of tone comparable scaled colors of a tone comparable color scale and storing the converted colors of pixels in the RAM of the computing device;

selecting the tone comparable color scale to use in analyzing frequency of tone comparable scaled colors of pixels in each resampled color image;

calculating the frequency of the tone comparable scaled colors of pixels in each resampled color image to identify one or more frequent tone comparable scaled color of pixels in each resampled color image without analyzing and understanding any object in each image;

identifying predominant colors in each resampled color image based on the one or more frequent tone comparable scaled color of pixels in the resampled color image;

determining tone comparable color scale values for the identified predominant colors of each resampled color image;

weighting the tone comparable color scale values of each resampled color image; and deriving, based on the weighted tone comparable color scale values, one or more personality attributes according to a particular psychological orientation.

2. The non-transitory computer readable medium of claim 1, wherein the program further comprises a set of instructions for identifying an image data source.

3. The non-transitory computer readable medium of claim 2, wherein the set of instructions for obtaining the plurality of color images comprises a set of instructions for retrieving the plurality of color images from a social networking site.

4. The non-transitory computer readable medium of claim 1, wherein the set of instructions for obtaining the plurality of color images comprises a set of instructions for retrieving the first color image in the plurality of color triages from a first social networking site and retrieving the second color image in the plurality of color images from a second social networking site.

5. A system that analyzes images and predicts personality to enhance business outcomes, said system comprising:

an end user computing device from which images are accessible to an end user of the end user computer device to select to use in predicting personality when connected over a public network to a personality prediction and business outcome enhancement service, wherein the end user of the end user computing device selects images from at least one of a storage of the end user computing device and a social networking site and uploads the selected images to the personality prediction and business outcome enhancement service to use in predicting personality of the end user by color analysis of the uploaded images in an object agnostic comparison of colors present in each uploaded image; and a personality prediction and business outcome enhancement data analyzer computing device that includes a random access memory (RAM) and a plurality of software modules that collectively provide the personality prediction and business outcome enhancement service, wherein the plurality of software modules comprises an image collector module that is configured to receive a plurality of color images associated with the end user from the end user computing device, a color extractor processing module that is configured to extract colors from each color image of the plurality of color images, and an attributes interpreter module that is configured to derive one or more personality attributes based on weighted tone comparable color scale values from the extracted colors and according to a particular psychological orientation of the end user, wherein the plurality of color images received by the image collector module of the personality prediction and business outcome enhancement service comprises a first color image that has a color space with a first range of colors in a first color scale and a second color image that has the same color space with a second range of colors in a second color scale, wherein the color extractor processing module of the personality prediction and business outcome enhancement service extracts colors from each color image of the plurality of color images by (i) resampling and storing in the RAM of the personality prediction and business outcome enhancement data analyzer computing device each color image in the plurality of color images associated with the end user to reduce a number of pixels to analyze in the color image and analyzing each resampled color image in the plurality of resampled color images to identify colors of pixels in the resampled color image, (ii) converting colors of pixels in each resampled color image in the plurality of resampled color images to pixels of tone comparable scaled colors of a tone comparable color scale and storing the converted colors of pixels in the RAM of the personality prediction and business outcome enhancement data analyzer computing device, (iii) selecting the tone comparable color scale to use in analyzing frequency of tone comparable scaled colors of pixels in each resampled color image, (iv) calculating the frequency of the tone comparable scaled colors of pixels in each resampled color image to identify one or more frequent tone comparable scaled color of pixels in each resampled color image without analyzing and understanding any object in each image, (v) identifying predominant colors in each resampled color image based on the one or more frequent tone comparable scaled color of pixels in the resampled color image, (vi) determining tone comparable color scale values for the identified predominant colors of each resampled color image, and (vii) weighting the tone comparable color scale values of each resampled color image, wherein the personality prediction and business outcome enhancement service is further configured to provide a plurality of business outcomes comprising personality insights of each end user.

6. The system of claim 5, wherein the color extractor processing module comprises a color scale manager that manages a plurality of color scales and identifies tone comparable color scales from colors of pixels of the color images.

7. The system of claim 5, wherein the attributes interpreter module derives the set of personality attributes based on applying a weighted color valuation in view of a psychometric table that includes expert opinions about personality, and in further view of a feedback predictor to receive comments from users.

* * * * *